No. 751,334. PATENTED FEB. 2, 1904.
T. O'SHAUGHNESSY.
SEWING AWL.
APPLICATION FILED JUNE 26, 1903.
NO MODEL.

WITNESSES:
Edward Thorpe.
C. R. Ferguson

INVENTOR
Thomas O'Shaughnessy
BY
Munn
ATTORNEYS

No. 751,334. Patented February 2, 1904.

UNITED STATES PATENT OFFICE.

THOMAS O'SHAUGHNESSY, OF SAN JOSE, CALIFORNIA.

SEWING-AWL.

SPECIFICATION forming part of Letters Patent No. 751,334, dated February 2, 1904.

Application filed June 26, 1903. Serial No. 163,225. (No model.)

*To all whom it may concern:*

Be it known that I, THOMAS O'SHAUGHNESSY, a citizen of the United States, and a resident of San Jose, in the county of Santa Clara and State of California, have invented a new and Improved Sewing-Awl, of which the following is a full, clear, and exact description.

This invention relates to improvements in sewing-awls designed particularly for use in repairing leather goods—such as harness, shoes, gloves, &c.—an object being to provide a sewing-awl adapted to be operated manually in making repairs and that shall be simple in construction and convenient to handle.

I will describe a sewing-awl embodying my invention and then point out the novel features in the appended claim.

Reference is to be had to the accompanying drawings, forming a part of this specification, in which similar characters of reference indicate corresponding parts in all the figures.

Figure 1:
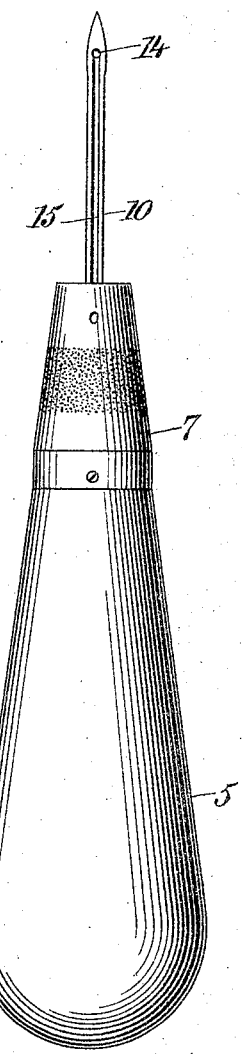
Figure 2:
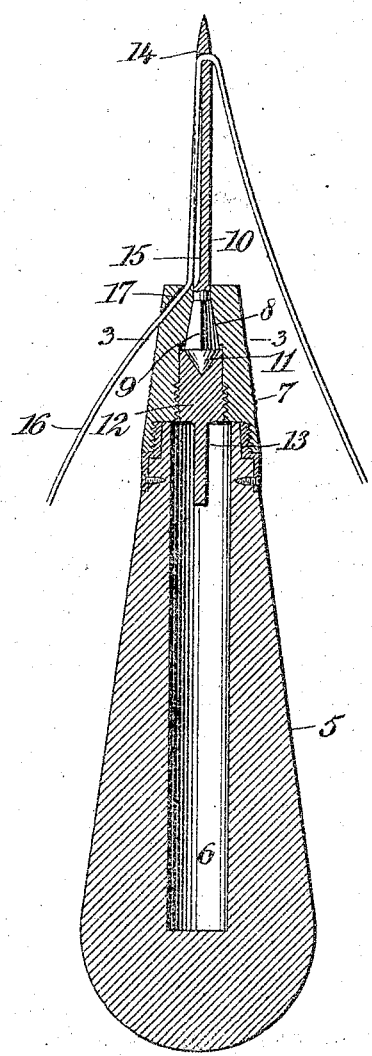
Figure 3:
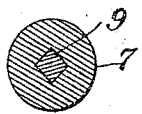
Figure 4:
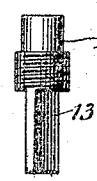

Figure 1 is a side elevation of a sewing-awl embodying my invention. Fig. 2 is a longitudinal section thereof. Fig. 3 is a section on the line 3 3 of Fig. 2, and Fig. 4 shows a locking-plug employed.

Referring to the drawings, 5 designates the handle of the awl, which, as indicated in Fig. 2, is chambered, as at 6, for receiving awls of different sizes. Removably connected to the end of the handle is a ferrule 7, the outer opening 8 of which has its walls tapered and made angular to receive the correspondingly-shaped shank portion 9 of the awl 10. The inner end of the shank 9 is made conical, as indicated at 11, to engage in a corresponding recess in a locking-plug 12. This plug 12 has an exterior screw-thread for engaging with the interior thread in the ferrule 7, and the inner end of the plug is provided with an angular lug 13 to be grasped by one's fingers for removing or inserting the plug. The awl 10 has an eye 14 near its pointed end, and preferably it is provided with a longitudinal channel 15, into which the thread passes. The thread 16 from the butt-end of the awl 10 passes through a guide-eye 17, formed in the ferrule 7 and having a terminal adjacent to the awl.

In the operation the threaded awl is passed through the leather or other material, and the thread is looped in a manner similar to that done by a sewing-machine.

Having thus described my invention, I claim as new and desire to secure by Letters Patent—

A sewing-awl comprising a handle, a tubular ferrule removably mounted on the handle, the walls of the outlet of the opening of said ferrule being angular, an awl having a shank corresponding in shape to the walls of said opening and having a conical end, a removable plug on the ferrule and having a recess to receive the conical end of the awl, and an angular lug extended from said plug.

In testimony whereof I have signed my name to this specification in the presence of two subscribing witnesses.

THOMAS O'SHAUGHNESSY.

Witnesses:
CHAS. A. SAWYER,
GEO. H. RICE.